(12) United States Patent
Dobbins et al.

(10) Patent No.: US 10,241,287 B2
(45) Date of Patent: *Mar. 26, 2019

(54) FIBER OPTIC SPLICE ENCLOSURES

(71) Applicant: AFL Telecommunications LLC, Duncan, SC (US)

(72) Inventors: Patrick E. Dobbins, Greer, SC (US); David Reeve, Taylors, SC (US); Richard Megill, Taylors, SC (US); Vahid Ebrahimi, Simpsonville, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/792,250

(22) Filed: Oct. 24, 2017

(65) Prior Publication Data

US 2018/0314022 A1    Nov. 1, 2018

Related U.S. Application Data

(63) Continuation of application No. 15/498,634, filed on Apr. 27, 2017, now Pat. No. 9,829,665.

(51) Int. Cl.
*G02B 6/00* (2006.01)
*G02B 6/255* (2006.01)
(Continued)

(52) U.S. Cl.
CPC ......... *G02B 6/4442* (2013.01); *G02B 6/3801* (2013.01); *G02B 6/3897* (2013.01);
(Continued)

(58) Field of Classification Search
CPC .... G02B 6/255; G02B 6/2558; G02B 6/3801; G02B 6/3897; G02B 6/4442;
(Continued)

(56) References Cited

U.S. PATENT DOCUMENTS 4,927,227 A    5/1990  Bensel, III et al.
5,007,701 A    4/1991  Roberts
(Continued)

FOREIGN PATENT DOCUMENTS

WO    WO9942882 A1    8/1999

OTHER PUBLICATIONS

AFL Telecommunications LLC; International Patent Application No. PCT/US2017/058013; International Search Report; Jan. 29, 2018; (1 page).

*Primary Examiner* — Michael Mooney
(74) *Attorney, Agent, or Firm* — Dority & Manning, P.A.

(57) ABSTRACT

A fiber optic splice enclosure includes a basket. The basket includes an outer shell, the outer shell including an outer sidewall defining at least a portion of a periphery of the basket. The basket further includes an insert disposed within the outer shell, the insert including a first sidewall and a second sidewall spaced apart from each other along a transverse axis and each extending along a longitudinal axis to define an inner channel therebetween. The first sidewall and the second sidewall are each further spaced apart from the outer sidewall along the longitudinal axis to define a first outer channel and a second outer channel. The fiber optic splice enclosure further includes a splice tray assembly including at least one splice tray, the splice tray assembly disposed within the inner channel.

17 Claims, 8 Drawing Sheets

(51) Int. Cl.
*G02B 6/44* (2006.01)
*G02B 6/38* (2006.01)

(52) U.S. Cl.
CPC ......... *G02B 6/4446* (2013.01); *G02B 6/4453* (2013.01); *G02B 6/4454* (2013.01); *G02B 6/4455* (2013.01); *G02B 6/4457* (2013.01); *G02B 6/4441* (2013.01); *G02B 6/4452* (2013.01)

(58) Field of Classification Search
CPC .. G02B 6/4444; G02B 6/4452; G02B 6/4453; G02B 6/4454; G02B 6/4457; G02B 6/4471
USPC ...................................... 385/95–99, 134–137
See application file for complete search history.

(56) References Cited

U.S. PATENT DOCUMENTS

| | | |
|---|---|---|
| 5,069,516 A | 12/1991 | Kohy et al. |
| 5,097,529 A | 3/1992 | Cobb et al. |
| 5,131,066 A | 7/1992 | Foss |
| 5,185,845 A | 2/1993 | Omura |
| 5,222,183 A | 6/1993 | Daems et al. |
| 5,278,933 A | 1/1994 | Hunsinger |
| 5,323,480 A | 6/1994 | Mullaney et al. |
| 5,396,575 A | 3/1995 | Hayward et al. |
| 5,446,823 A | 8/1995 | Bingham et al. |
| 5,479,554 A | 12/1995 | Roberts |
| 5,481,639 A | 1/1996 | Cobb et al. |
| 5,509,099 A | 4/1996 | Hermsen et al. |
| 5,553,186 A | 9/1996 | Allen |
| 5,596,670 A | 1/1997 | Debortoli et al. |
| 5,602,954 A | 2/1997 | Nolf et al. |
| 5,734,776 A | 3/1998 | Puetz |
| 5,764,844 A | 6/1998 | Mendes |
| 5,774,618 A | 6/1998 | Jones |
| 5,790,739 A | 8/1998 | Strause |
| 5,835,658 A | 11/1998 | Smith |
| 6,009,225 A | 12/1999 | Ray et al. |
| 6,014,490 A | 1/2000 | Canning et al. |
| 6,201,921 B1 | 3/2001 | Quesnel et al. |
| 6,253,016 B1 | 6/2001 | Daoud |
| 6,275,639 B1 | 8/2001 | Bolt |
| 6,304,707 B1 | 10/2001 | Daems et al. |
| 6,424,782 B1 | 7/2002 | Ray |
| 6,434,313 B1 | 8/2002 | Clapp, Jr. et al. |
| 6,496,640 B1 | 12/2002 | Harvey et al. |
| 6,504,987 B1 | 1/2003 | Macken et al. |
| 6,539,160 B2 | 3/2003 | Battey et al. |
| 6,542,688 B1 | 4/2003 | Battey et al. |
| 6,628,880 B2 | 9/2003 | Roberts |
| 6,778,752 B2 | 8/2004 | Laporte et al. |
| 6,856,747 B2 | 2/2005 | Cloud et al. |
| 7,038,137 B2 | 5/2006 | Grubish et al. |
| 7,045,710 B1 | 5/2006 | Allen et al. |
| 7,239,789 B2 | 7/2007 | Grubish et al. |
| 7,333,706 B2 | 2/2008 | Parikh et al. |
| 7,583,885 B2 | 9/2009 | Kowalczyk et al. |
| 7,697,812 B2 * | 4/2010 | Parikh .................. G02B 6/4446 385/134 |
| 7,702,208 B2 | 4/2010 | Mudd et al. |
| 8,861,919 B2 | 10/2014 | Alston et al. |
| 8,891,930 B2 | 11/2014 | Anguiano et al. |
| 9,494,760 B2 | 11/2016 | Simmons et al. |
| 9,829,665 B1 * | 11/2017 | Dobbins .............. G02B 6/4442 |
| 2003/0231849 A1 | 12/2003 | Rodriguez et al. |
| 2012/0237173 A1 | 9/2012 | Alston et al. |
| 2014/0044400 A1 | 2/2014 | Anguiano |

* cited by examiner

FIBER OPTIC SPLICE ENCLOSURES

CROSS-REFERENCE TO RELATED APPLICATIONS

The present application is a continuation of and claims priority to U.S. patent application Ser. No. 15/498,634 having a filing date of Apr. 27, 2017, which is incorporated by reference herein in its entirety.

FIELD

The present disclosure relates generally to fiber optic splice enclosures, and more particularly to fiber optic splice enclosures that may be utilized with various types of fiber optic cables.

BACKGROUND

Fiber optic cables are widely used for data transmission. In most cases, the cables are either suspended from support structures such as utility structures or are placed in manholes or handholes. Often these fiber optic cables need to be spliced during initial installation to connect different cable runs, and once in operation, for adding additional cable runs, rerouting, maintenance or repair. It is important that this splicing does not interrupt the total data transmission of the cables involved. Because each of these fiber optic cables typically carry many different transmission systems via individual optical fibers, a complete disruption of the cable continuity is not acceptable when access to, for instance, a single optical fiber is desired. Thus, access must be provided to the individual transmission systems or fibers to implement a new splice at a portion of a fiber optic cable without totally disrupting the continuity of all the associated bundled fibers.

Various fiber optic splice enclosures are known which house portions of cables and spliced optical fibers thereof. However, developments in optical fiber and ribbon technology have advanced, and such known enclosures may not be suitable for such developments. For example, in some cases, fiber optic cables may include optical fibers or optical fiber ribbons which do not include protective buffer tubes. Known fiber optic splice enclosures may thus require that transition tubes be provided on the optical fibers to protect them before routing the optical fibers within the fiber optic splice enclosures. This can result in significant delays when attempting to route cables and optical fibers thereof within a known fiber optic splice enclosures. Further, the access point for optical fibers to enter spice trays within known fiber optic splice enclosures may be relatively congested, leading to further difficulties in routing.

Accordingly, improved fiber optic splice enclosures which address the above-identified issues and which may be utilized with improved optical fiber and ribbon technologies are desired.

BRIEF DESCRIPTION

Aspects and advantages of the invention will be set forth in part in the following description, or may be obvious from the description, or may be learned through practice of the invention.

In accordance with one embodiment, a fiber optic splice enclosure is provided. The fiber optic splice enclosure includes a basket. The basket includes an outer shell, the outer shell including an outer sidewall defining at least a portion of a periphery of the basket. The basket further includes an insert disposed within the outer shell, the insert including a first sidewall and a second sidewall spaced apart from each other along a transverse axis and each extending along a longitudinal axis to define an inner channel therebetween. A first opening to the inner channel is defined between first ends of the first and second sidewalls and a second opening to the inner channel is defined between second ends of the first and second sidewalls. The first sidewall and the second sidewall are each further spaced apart from the outer sidewall along the longitudinal axis to define a first outer channel and a second outer channel. The fiber optic splice enclosure further includes a splice tray assembly including at least one splice tray, the splice tray assembly disposed within the inner channel.

In accordance with another embodiment, a fiber optic splice enclosure is provided. The fiber optic splice enclosure includes a basket. The basket includes an outer shell, the outer shell including an outer sidewall defining at least a portion of a periphery of the basket. The basket further includes an insert disposed within the outer shell, the insert including a first sidewall and a second sidewall spaced apart from each other along a transverse axis and each extending along a longitudinal axis to define an inner channel therebetween. The first sidewall and the second sidewall are each further spaced apart from the outer sidewall along the longitudinal axis to define a first outer channel and a second outer channel. The insert further includes a first tab and a second tab, the first tab extending into the inner channel from the first sidewall, the second tab extending into the inner channel from the second sidewall. The insert further includes a base wall oriented transverse to the first and second sidewalls. The fiber optic splice enclosure further includes a splice tray assembly including at least one splice tray, the splice tray assembly disposed within the inner channel. The splice tray assembly sits on the first tab and second tab within the inner channel and is spaced along a vertical axis from the base wall to define a gap between the splice tray assembly and the base wall.

In accordance with another embodiment, a fiber optic splice enclosure is provided. The fiber optic splice enclosure includes a basket. The basket includes an outer shell, the outer shell including an outer sidewall defining at least a portion of a periphery of the basket. The basket further includes an insert disposed within the outer shell, the insert including a first sidewall and a second sidewall spaced apart from each other along a transverse axis and each extending along a longitudinal axis to define an inner channel therebetween. A first opening to the inner channel is defined between first ends of the first and second sidewalls and a second opening to the inner channel is defined between second ends of the first and second sidewalls. The first sidewall and the second sidewall are each further spaced apart from the outer sidewall along the longitudinal axis to define a first outer channel and a second outer channel. The fiber optic splice enclosure further includes a splice tray assembly including at least one splice tray, the splice tray assembly disposed within the inner channel, wherein a top surface of the splice tray assembly is below a top edge of the first sidewall and the second sidewall along a vertical axis. The fiber optic splice enclosure further includes a cable inlet assembly connected to the outer shell, the cable inlet assembly including a plurality of cable ports therethrough, and an outer tube provided around and enclosing the basket.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION

A full and enabling disclosure of the present invention, including the best mode thereof, directed to one of ordinary skill in the art, is set forth in the specification, which makes reference to the appended figures, in which.

DETAILED DESCRIPTION

Figure 1:
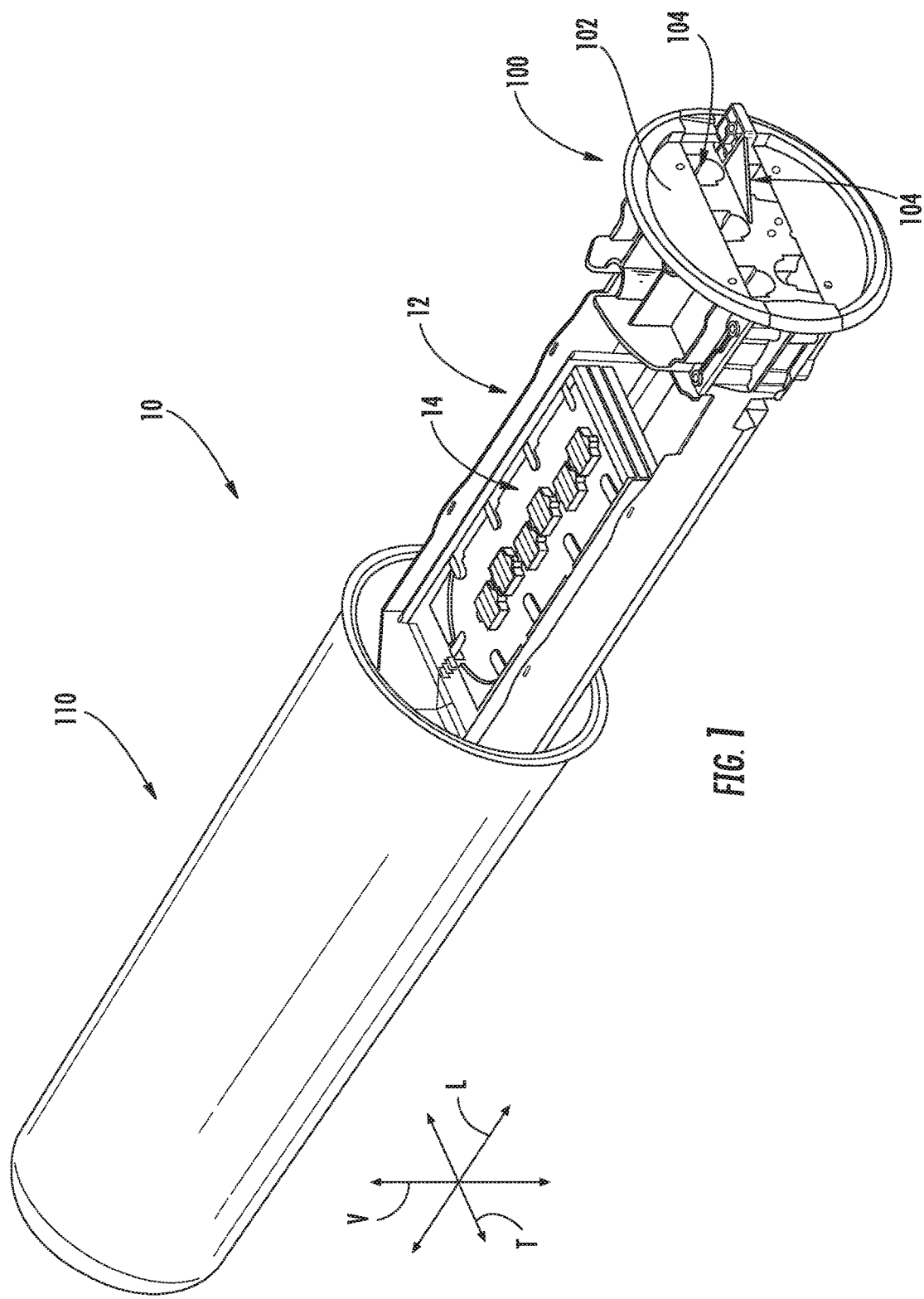
FIG. 1 is a perspective view of a fiber optic splice enclosure, with an outer tube partially removed, in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to improved fiber optic splice enclosures. Enclosures in accordance with the present disclosure may generally be used for fiber splicing and routing, as well as excess fiber storage. Such enclosures are typically used to provide mid-cable access and splicing. Fiber optic splice enclosures in accordance with the present disclosure are particularly useful, for example, with certain new and recently developed optical fiber ribbon designs, such as designs in which the optical fibers are intermittently bonded together. One particular advantage of fiber optic splice enclosures in accordance with the present disclosure is that no buffer tubes or transition tubes are necessary to protect the optical fibers within the fiber optic splice enclosure, thus decreasing the closure assembly times. Rather, routing and protection of the optical fibers within such fiber optic splice enclosures is improved. In addition to improved routing paths and storage areas for excess optical fiber lengths within such fiber optic splice enclosures, the entry location for such optical fibers to enter splice trays within such fiber optic splice enclosures is improved to provide better protection, reduce congestion, and increase the ease with which the optical fibers are provided into such splice trays.

Referring now to FIGS. 1 through 7, fiber optic splice enclosures 10 in accordance with the present disclosure are illustrated. As shown, the fiber optic splice enclosure 10 may extend along and within a longitudinal axis L, a vertical axis V, and a transverse axis T, all of which are mutually orthogonal to define a coordinate system of the enclosure 10. An enclosure 10 includes a basket 12 and a splice tray assembly 14 disposed within the basket 12. Basket 12 may include an outer shell 20. The outer shell 20 may be the outermost component of the basket 12 in which other components of the basket 12 are positioned. As shown, outer shell 20 may include an outer sidewall 22 which defines at least a portion of a periphery of the basket 12. For example, as shown, outer sidewall 22 may have a generally U-shaped profile with a single open end at which cables enter the basket 12.

Figure 2:
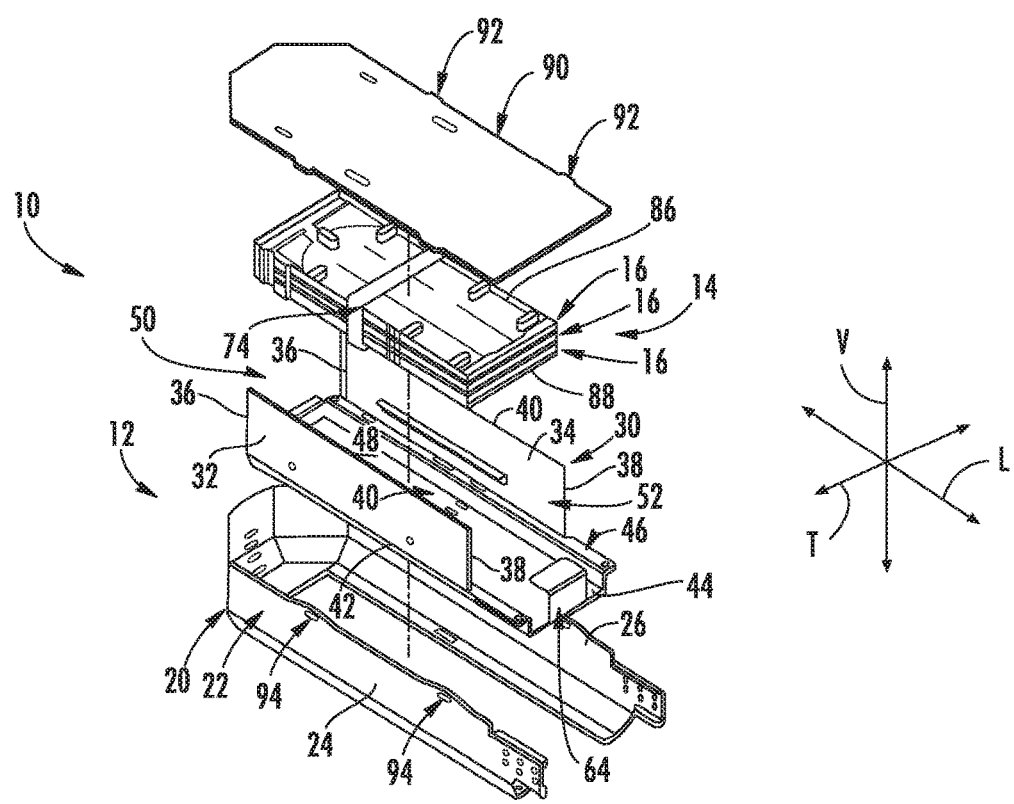
FIG. 2 is an exploded perspective view of components of a fiber optic splice enclosure in accordance with embodiments of the present disclosure.
Figure 3:
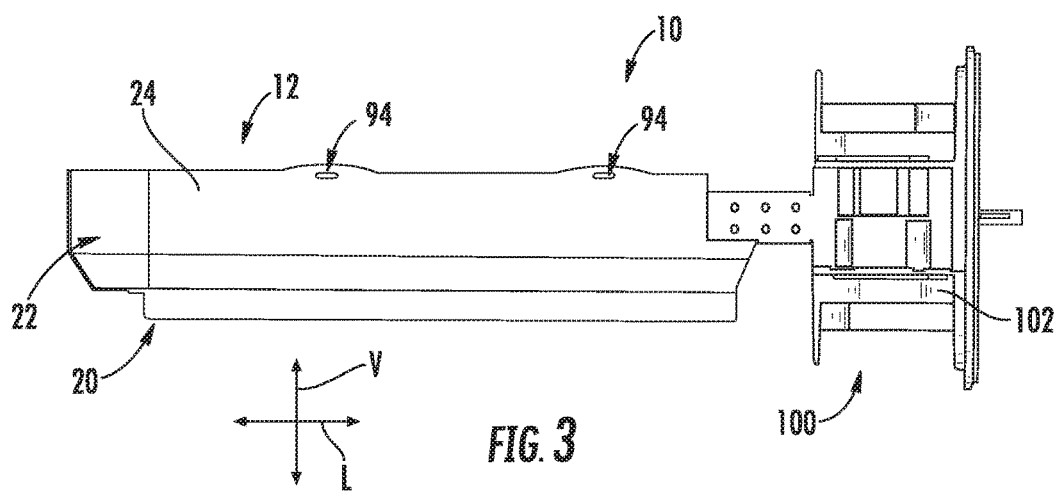
FIG. 3 is a side view of components of a fiber optic splice enclosure in accordance with embodiments of the present disclosure.
Figure 4:
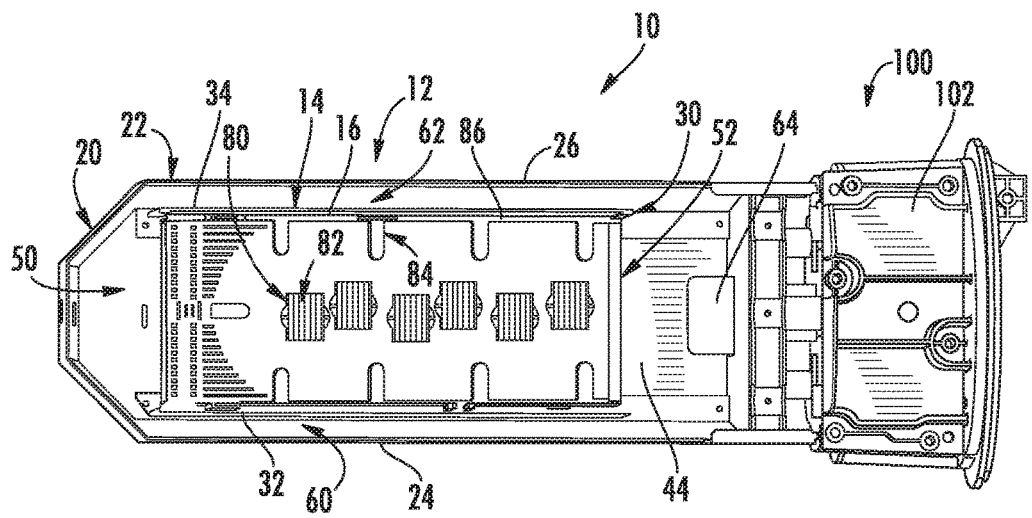
FIG. 4 is a top view of components of a fiber optic splice enclosure in accordance with embodiments of the present disclosure.
Figure 5:
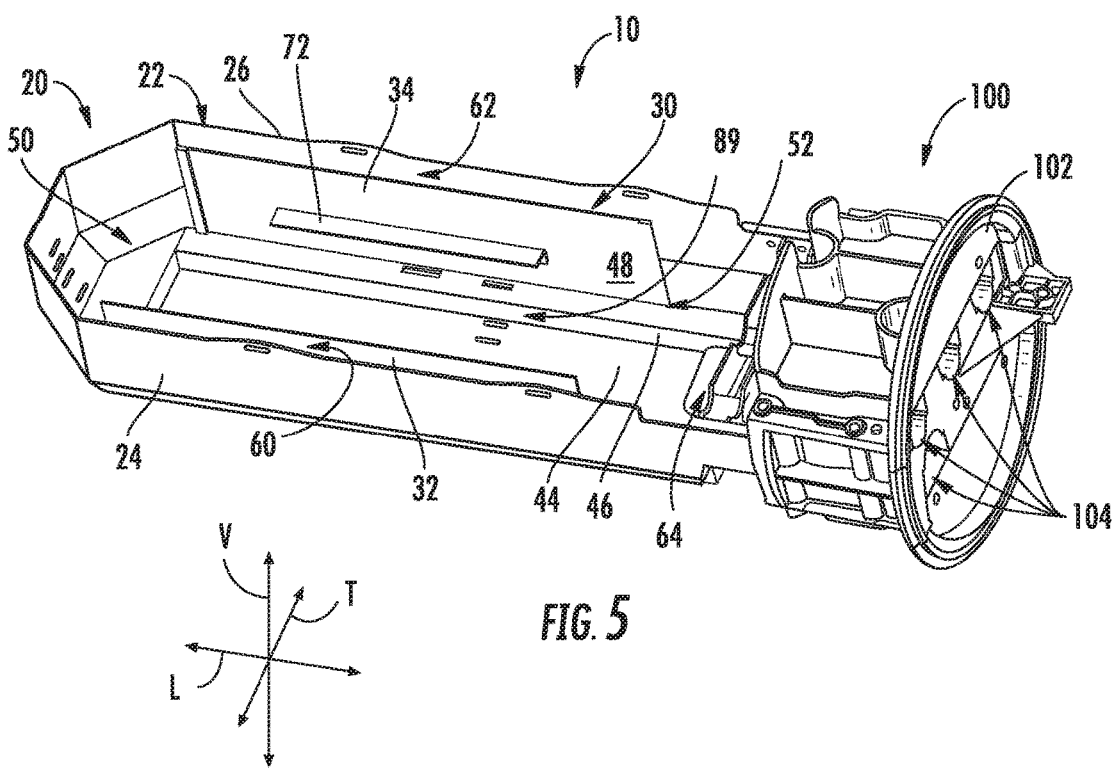
FIG. 5 is a perspective view of components of a fiber optic splice enclosure in accordance with embodiments of the present disclosure.
Figure 6:
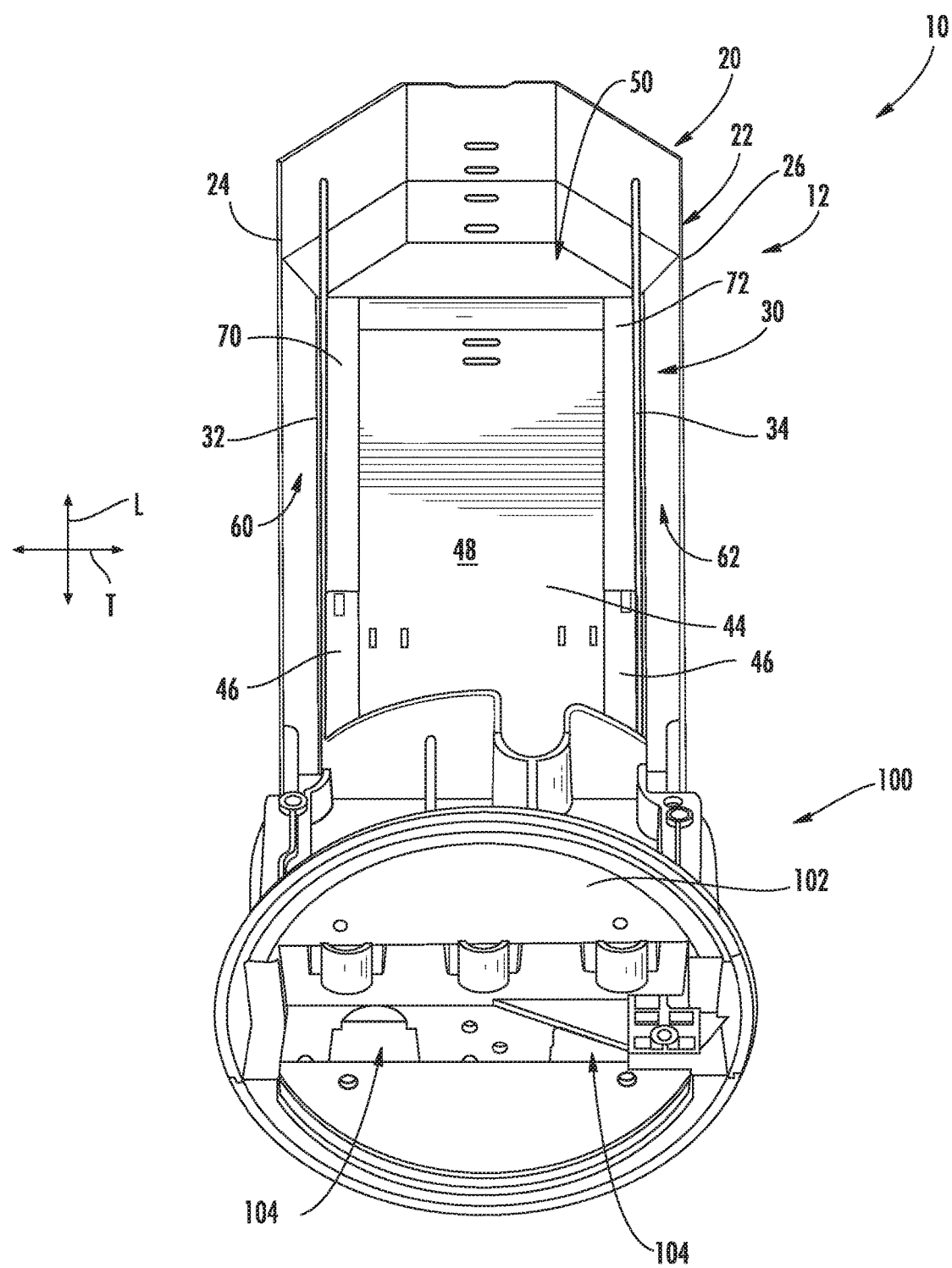
FIG. 6 is an end perspective view of components of a fiber optic splice enclosure in accordance with embodiments of the present disclosure.
Figure 7:
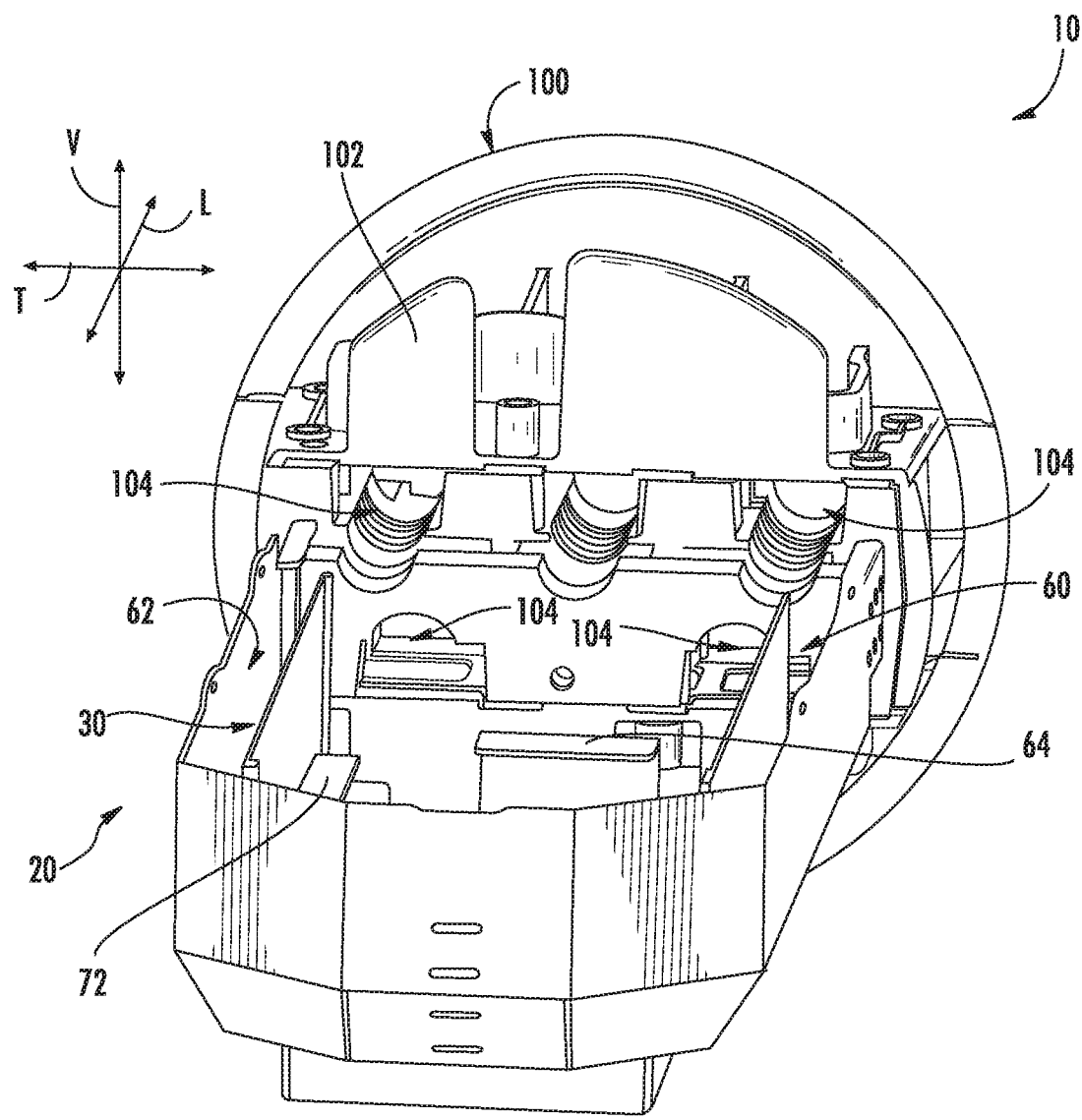
FIG. 7 is an opposing end perspective view of components of a fiber optic splice enclosure in accordance with embodiments of the present disclosure.

An insert 30 may be disposed within the outer shell 20. Insert 30 may, in some embodiments as shown in FIG. 2, be a separate component from the outer shell 20. Alternatively, however, insert 30 and outer shell 20 may be formed together as a single component. Insert 30 may include a first sidewall 32 and a second sidewall 34 which may be spaced apart from each other along the transverse axis T, as shown. Each sidewall 32, 34 may extend along the longitudinal axis L between a first end 36 and a second end 38, and may further extend along the vertical axis V between a top edge 40 and a bottom edge 42. In exemplary embodiments, insert 30 further includes a base wall 44 which is oriented transverse to the first and second sidewalls 32, 34. In some embodiments, the bottom edge 42 of each sidewall 32, 34 is connected to the base wall 44. Alternatively, as shown, an intermediate bracket 46 (which may for example be L-shaped as shown) extends between and connects each sidewall 32, 34 to the base wall 44.

An inner channel 48 may be defined between the sidewalls 32, 34 along the transverse axis T. Further, in exemplary embodiments as shown, the inner channel 48 may be accessible along the longitudinal axis L through both ends of the spacing between the sidewalls 32, 34. More specifically, a first opening 50 to the inner channel 48 may be defined between the first ends 36 of the sidewalls 32, 34. Additionally, a second opening 52 to the inner channel 48 may be defined between the second ends 38 of the sidewalls 32, 34. Such accessibility advantageously facilitates ease of routing and entry to the splice tray assembly 14 as discussed herein, reducing congestion and improving assembly time. In particular, because the first opening 50 exists on an opposite side (along the longitudinal axis L) of the enclosure 10 to the side on which the cables enter the enclosure 10, congestion is reduced, protection to the fiber provided, and ease of entry to the splice tray assembly 14 is facilitated through the first opening 50.

As further illustrated, the first sidewall 32 and second sidewall 34 are each spaced apart from the outer sidewall 22, such as from portions thereof that extend generally parallel to the first sidewall 32 and second sidewall 34, to define a first outer channel 60 and a second outer channel 62. More specifically, a first outer channel 60 may be defined between the first sidewall 32 and a first outer sidewall portion 24 extending generally parallel thereto. A second outer channel 62 may be defined between the second sidewall 32 and a second outer sidewall portion 26 extending generally parallel thereto. The first and second outer channels 60, 62 may thus be spaced apart along the transverse axis T and may extend along the longitudinal axis L, as shown. Such channels 60, 62 advantageously provide improved routing and protection of optical fibers within the basket 12. Excess optical fiber length is routed through the channels 60, 62 and protected by the sidewalls defining the channels 60, 62 as discussed herein.

In some embodiments, a bracket 64 may extend from the base wall 44. Bracket 64 may be spaced from the second ends 38 of the sidewalls 32, 34 along the longitudinal direction L, and may serve as an additional routing and protective component for optical fibers in the enclosure 10. For example, optical fiber lengths extending between the channels 60, 62 generally along the transverse axis T may be positioned underneath the bracket 64, such as between the bracket 64 and base wall 44. This positioning serves to secure the optical fibers and ensure that the optical fibers are prevented from moving along the vertical axis V out of the channels 60, 62. In exemplary embodiments, such bracket 64 may be an L-shaped bracket, with a portion of the bracket 64 extending towards the inner channel 48.

In some embodiments, a first tab 70 and a second tab 72 may be included which extend from the first and second sidewalls 32, 34. First tab 70 may extend into the inner channel 48, such as along the transverse axis T, from the first sidewall 32. Second tab 72 may extend into the inner channel 48, such as along the transverse axis T, from the second sidewall 34. The tabs 70, 72 may be positioned along the vertical axis V between the base wall 44 and the top edges 40 of the sidewalls 32, 34. As discussed herein, tabs 70, 72 may advantageously appropriately position and secure the splice tray assembly 14 within the basket 12.

As shown, enclosure 10 includes a splice tray assembly 14. The splice tray assembly 14 includes at least one, such as in some embodiments a plurality of, splice trays 16. In exemplary embodiments, the splice tray assembly 14 consists of two, three, or four splice trays 16. Splices between spliced together optical fibers may be positioned and secured within the splice trays 16. For example, each splice tray 16 may include one or more splice holders 80 in which splice channels 82 are defined. Splices between spliced together optical fibers are inserted into such splice channels 82. Additionally, tabs 84 may be provided in each splice tray 16 for routing and containing excess optical fiber within the splice trays 16.

When multiple splice trays 16 are utilized in a splice tray assembly 14, the trays 16 may be stacked along the vertical axis V, as shown, with one splice tray 16 on top of another in a linear vertical array. A top surface 86 and a bottom surface 88 may further be defined for the splice tray assembly 14. The top surface 86 is the uppermost top surface of the top splice tray 16 of the assembly 14 along the vertical axis V. The bottom surface 88 is the lowermost bottom surface of the bottom splice tray 16 of the assembly 14 along the vertical axis V. In exemplary embodiments, the top surface 86 is below the top edges 40 of the first and second sidewalls 32, 34 along the vertical axis V. Such positioning facilitates protection of the optical fibers by the first and second sidewalls 32, 34.

In exemplary embodiments, the splice tray assembly 14, such as the bottom surface 88 thereof, is spaced along the vertical axis V from the base wall 44. Accordingly, a gap 89 is defined between the splice tray assembly 14, such as the bottom surface 88 thereof, and the base wall 44. Such gap 89 advantageously provides additional storage areas for excess optical fiber, express fiber from mid-cable access, etc. In exemplary embodiments, such gap 89 is facilitated by the first and second tabs 70, 72. Specifically, the splice tray assembly 14 may sit on the first tab 70 and second tab 72 within the inner channel 48, such that for example the bottom surface 88 contacts the first tab 70 and second tab 72.

When the splice tray assembly 14 is provided in the inner channel 48, a strap 74 may be provided to secure the splice tray assembly 14 therein. The strap 74 may extend through the tabs 70, 72 and/or sidewalls 32, 34 and around the splice tray assembly 14 to secure the splice tray assembly 14 to the tabs 70, 72 and/or sidewalls 32, 34.

As shown, a cover panel 90 may be provided. The cover panel 90 may be connectable to the outer sidewall 22 of the outer shell 20 such that the splice tray assembly 14 is generally enclosed beneath the cover panel 90 along the vertical axis V. In exemplary embodiments, the cover panel 90 may include a plurality of tabs 92, and a plurality of slots 94 may be defined in the outer sidewall 22. The tabs 92 may be insertable into the slots 94 to connect the cover panel 90 to the outer sidewall 22.

Enclosure 10 may further include a cable inlet assembly 100. The cable inlet assembly 100 may be connected to the outer shell 20. In some embodiments, as shown, the cable inlet assembly 100 is a separate component from the outer shell 20. Alternatively, the cable inlet assembly 100 and outer shell 20 may be formed together as a single component. The cable inlet assembly 100 may include a body 102, which may have a generally cylindrical profile. The cable inlet assembly 100 may further include one or more cable ports 104 extending through the body 102, such as along the longitudinal axis L. Fiber optic cables may extend through the cable ports 104 to enter the basket 12.

Enclosure 10 may further include an outer tube 110. The outer tube 110 may, when assembled, be provided around and enclose the basket 12. When assembled, the basket 12 may be completely surrounded by the outer tube 110 and cable inlet assembly 100, such that the basket 12 and optical fibers therein are generally protected by the enclosure 10 and cable inlet assembly 100.

Figure 8:
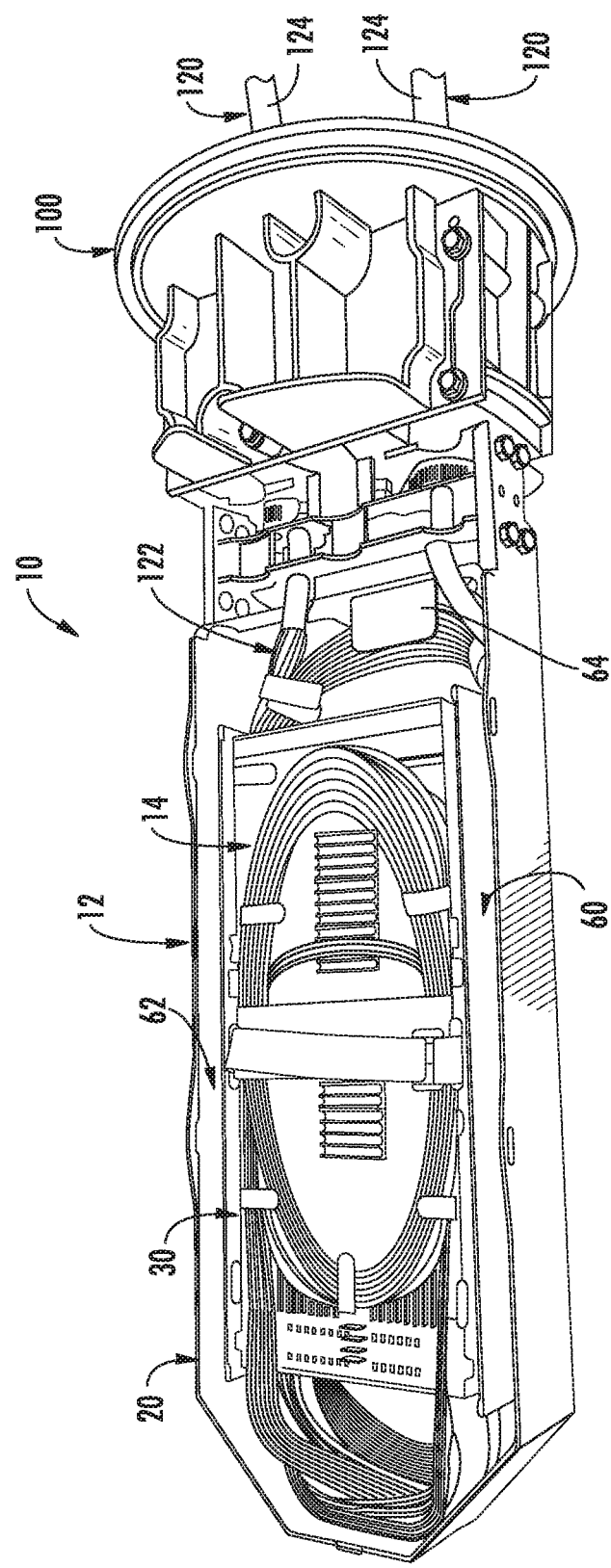
FIG. 8 is a perspective view of components of a fiber optic splice enclosure along with fiber optic cables routed therein in accordance with embodiments of the present disclosure.
Figure 9:
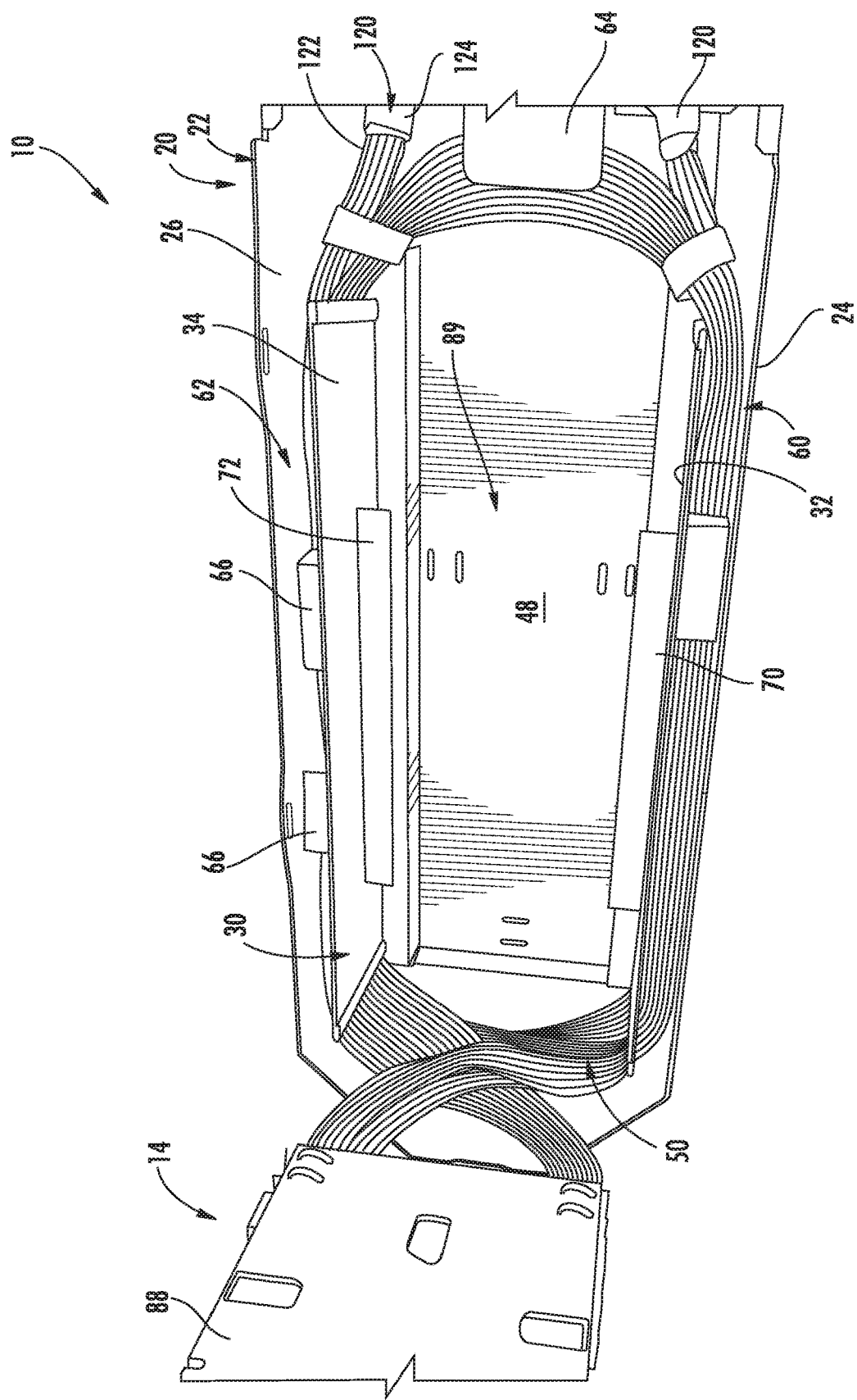
FIG. 9 is a top perspective view of components of a fiber optic splice enclosure along with fiber optic cables during routing and assembly in accordance with embodiments of the present disclosure.

FIGS. 8 and 9 illustrate cables 120 and optical fiber 122 thereof positioned within an enclosure 10 in accordance with embodiments of the present disclosure. As shown, the cables 120 enter the enclosure 10 through the cable ports 104. Within the enclosure 10, the optical fibers 122 may extend from the outer layer(s) 124 of the cables 120 surrounding the optical fibers 122 such that the optical fibers 122 are exposed. The optical fibers 122 may be routed from the cable ports 104 through the first and second outer channels 60, 62 and under the bracket 64. Inserts 66 such as foam blocks may be inserted into the first and second outer channels 60, 62 to, along with bracket 64, prevent the optical fibers 122 from moving along the vertical axis V out of the channels 60, 62. The optical fibers 122 may then enter the inner channel 48 through the first opening 50 which, as discussed, is a distal opening to the inner channel 48 from the cable inlet assembly 100 relative to the second opening 52. Within the inner channel 48, the optical fibers 122 enter the splice trays 16 and are routed and spliced.

Figure 10:
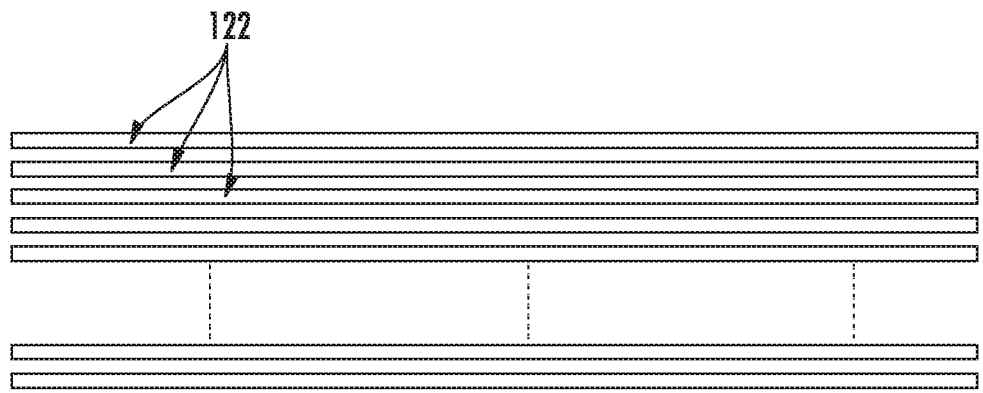
FIG. 10 is a top view of a plurality of optical fibers utilized in a fiber optic cable in accordance with embodiments of the present disclosure.
Figure 11:
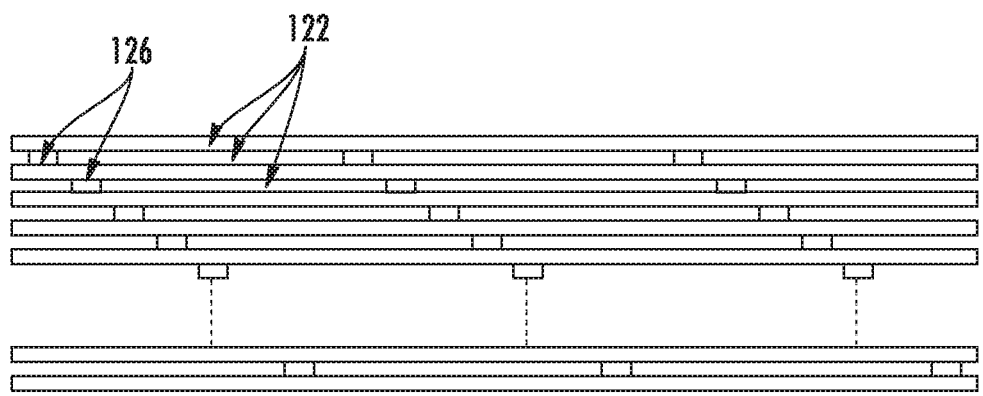
FIG. 11 is a top view of a plurality of optical fibers utilized in a fiber optic cable in accordance with other embodiments of the present disclosure.

Any suitable optical fibers 122 may be utilized in cables 120. For example, the optical fibers 122 may be single mode optical fibers or multi-mode optical fibers. Further, in some embodiments, the optical fibers 122 may have nominal (plus or minus 3 microns) outer diameters of 250 microns. In alternative embodiments, the optical fibers 122 may have nominal outer diameters of 200 microns. In some embodiments, as illustrated in FIG. 10, the optical fibers 122 may be loose optical fibers which are not ribbonized or otherwise bonded to each other. In alternative exemplary embodiments, the optical fibers 122 may be ribbonized to form one or more ribbons. For example, in some embodiments as illustrated in FIG. 10, the optical fibers 122 may be intermittently bonded to each other (via, for example, portions of the outermost jacket or layer of the optical fibers 122), thus forming one or more ribbons. Such intermittent bonding may occur along the lengths of the optical fibers 122, thus leaving non-bonded gaps between neighboring optical fibers 122 as shown. Further, the bonded portions 126 of neighboring optical fibers 122 may be staggered along the lengths of the optical fibers 122 such that neighboring optical fibers 122 in a ribbon are bonded to each other at different locations along their lengths and the length of the ribbon.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fiber optic splice enclosure, comprising:
   a basket, the basket comprising:
      an outer shell, the outer shell comprising an outer sidewall defining at least a portion of a periphery of the basket; and
      an insert disposed within the outer shell, the insert comprising a first sidewall and a second sidewall spaced apart from each other along a transverse axis and each extending along a longitudinal axis to define an inner channel therebetween, the first sidewall and the second sidewall each further spaced apart from the outer sidewall along the longitudinal axis to define a first outer channel and a second outer channel;
   a splice tray assembly comprising at least one splice tray, the splice tray assembly disposed within the inner channel; and
   an outer tube provided around and enclosing the basket.

2. The fiber optic splice enclosure of claim 1, wherein an opening to the inner channel is defined between at least one of first ends of the first and second sidewalls or second ends of the first and second sidewalls.

3. The fiber optic splice enclosure of claim 1, wherein the splice tray assembly comprises a plurality of splice trays disposed within the inner channel, the plurality of splice trays stacked along a vertical axis.

4. The fiber optic splice enclosure of claim 1, wherein the insert further comprises a base wall oriented transverse to the first and second sidewalls, wherein the splice tray assembly is spaced along a vertical axis from the base wall to define a gap between the splice tray assembly and the base wall.

5. The fiber optic splice enclosure of claim 1, wherein a top surface of the splice tray assembly is below a top edge of the first sidewall and the second sidewall along a vertical axis.

6. The fiber optic splice enclosure of claim 1, further comprising a first tab and a second tab, the first tab extending into the inner channel from the first sidewall, the second tab extending into the inner channel from the second sidewall, wherein the splice tray assembly sits on the first tab and second tab within the inner channel.

7. The fiber optic splice enclosure of claim 1, wherein the insert further comprises a base wall oriented transverse to the first and second sidewalls further comprising a bracket extending from the base wall.

8. The fiber optic splice enclosure of claim 1, further comprising a cover panel connectable to the outer sidewall.

9. The fiber optic splice enclosure of claim 1, further comprising a cable inlet assembly connected to the outer shell, the cable inlet assembly comprising a plurality of cable ports therethrough.

10. A fiber optic splice enclosure, comprising:
    a basket, the basket comprising:
       an outer shell, the outer shell comprising an outer sidewall defining at least a portion of a periphery of the basket; and
       an insert disposed within the outer shell, the insert comprising a first sidewall and a second sidewall spaced apart from each other along a transverse axis and each extending along a longitudinal axis to define an inner channel therebetween, the first sidewall and the second sidewall each further spaced apart from the outer sidewall along the longitudinal axis to define a first outer channel and a second outer channel;
    a splice tray assembly comprising at least one splice tray, the splice tray assembly disposed within the inner channel;
    a cable inlet assembly connected to the outer shell, e cable inlet assembly comprising a plurality of cable ports therethrough; and
    an outer tube provided around and enclosing the basket.

11. The fiber optic splice enclosure of claim 10, wherein an opening to the inner channel is defined between at least one of first ends of the first and second sidewalls or second ends of the first and second sidewalls.

12. The fiber optic splice enclosure of claim 10, wherein the splice tray assembly comprises a plurality of splice trays disposed within the inner channel, the plurality of splice trays stacked along a vertical axis.

13. The fiber optic splice enclosure of claim 10, wherein the insert further comprises a base wall oriented transverse to the first and second sidewalls, wherein the splice tray assembly is spaced along a vertical axis from the base wall to define a gap between the splice tray assembly and the base wall.

14. The fiber optic splice enclosure of claim 10, wherein a top surface of the splice tray assembly is below a top edge of the first sidewall and the second sidewall along a vertical axis.

15. The fiber optic splice enclosure of claim 10, further comprising a first tab and a second tab, the first tab extending into the inner channel from the first sidewall, the second tab extending into the inner channel from the second sidewall, wherein the splice tray assembly sits on the first tab and second tab within the inner channel.

16. The fiber optic splice enclosure of claim 10, wherein the insert further comprises a base wall oriented transverse to the first and second sidewalls, further comprising a bracket extending from the base wall.

17. The fiber optic splice enclosure of claim 10, further comprising a cover panel connectable to the outer sidewall.

* * * * *